Jan. 10, 1933.    A. THOMA    1,894,228
METHOD OF FILLING SHOES
Filed Aug. 26, 1929
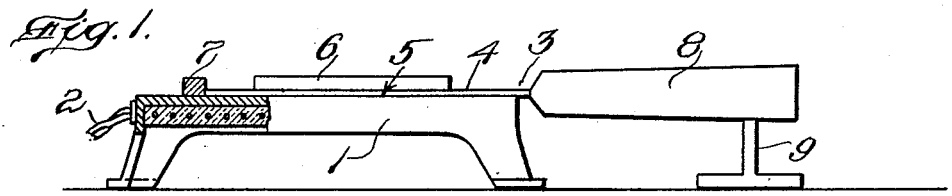
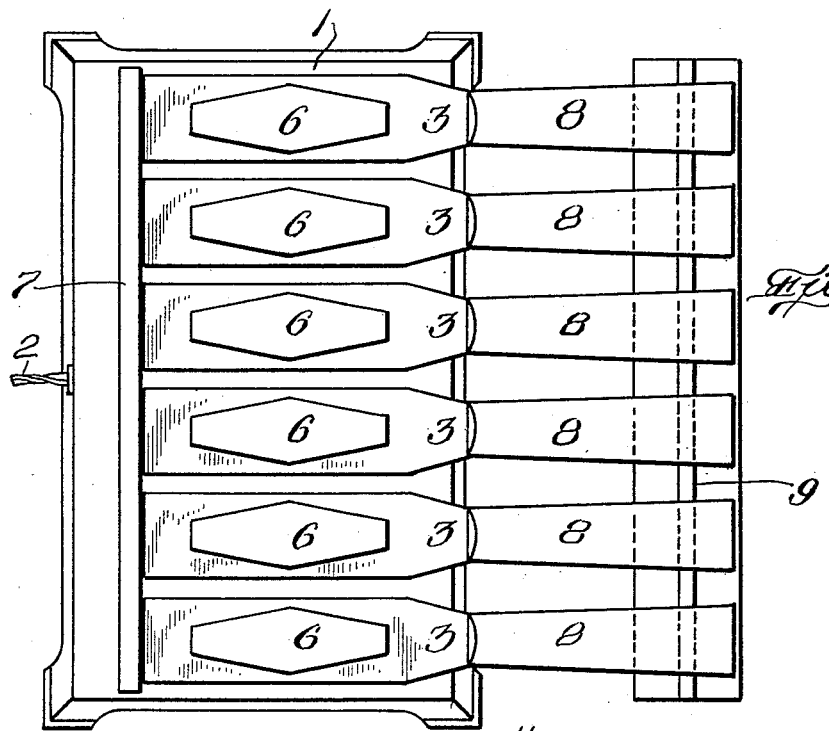
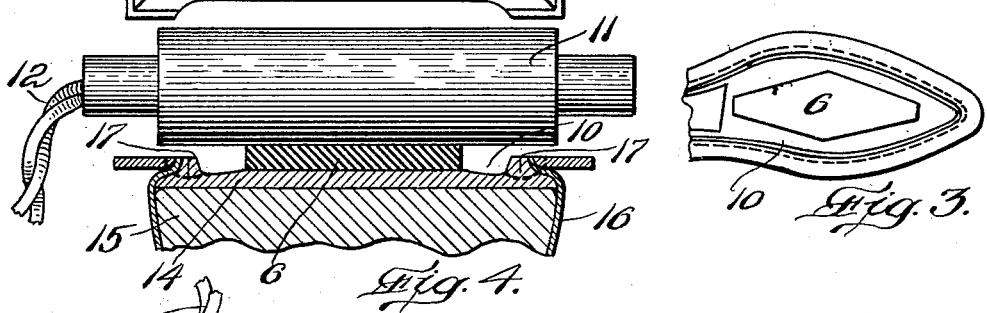
Inventor:
Andrew Thoma
by Roberts, Cushman & Woodberry,
Attys Patented Jan. 10, 1933

1,894,228

UNITED STATES PATENT OFFICE

ANDREW THOMA, OF CAMBRIDGE, MASSACHUSETTS, ASSIGNOR TO NORTH AMERICAN CHEMICAL COMPANY, OF CAMBRIDGE, MASSACHUSETTS, A CORPORATION OF MASSACHUSETTS

METHOD OF FILLING SHOES

Application filed August 26, 1929. Serial No. 388,320.

My present method of filling shoe-bottom cavities is a continuation in part of my copending application Ser. No. 297,630 filed Aug. 6, 1928. Low melting point binders have always heretofore been used in connection with the spreading of plastic fillers because (1) a slow heat has necessarily been employed in the shoe factories (as it had to be maintained all day), (2) the high heat if long maintained would burn the filler body material, (3) the workman could not endure a long maintained high heat, (4) the filler, being in the form of a large mass (and originally a highly compressed loaf) resisted heat penetration, so that it had to be a low heat in order to penetrate fully to the interior without the danger of disintegrating the filler or separating the body material and the binder by the too great liquefying of the latter on the outside before conditioning the interior, (5) as the body material of the filler is ground cork or the like, a sudden high heat would burn, that is to say, would char and ruin the filler and destroy its resiliency and life, and (6) the binders used would become too liquid and therefore unmanageable in the filler if subjected to a high heat.

The present method makes possible and practicable the use of a very sudden high heat. By this I mean heat sufficiently high to soften a high melting point binder and of sufficiently short duration to prevent injury to the shoe and to the body materials commonly used, such as comminuted cork, which are susceptible to burning if subjected for a substantial period of time to the high heat necessary to soften the high melting point binder. The filler is preferably made with a binder which requires a high heat and then becomes sticky or tacky or if made with low-melting binder, it preferably contains a portion as a cover-crust or in the filler near the surface which requires a high heat, and is made in the form of a piece which is more or less flat. The heat is provided by any convenient heater such as an electrical "hot-plate" which is large enough to hold from four to six or eight filler laying tools such as hand-knives or spatulas, as shown in my copending filling machine application Ser. No. 388,321, filed Aug. 26, 1929. The operator places a filler piece on each knife and then places the knife with the piece thereon on the heater with its blade next to the heater and flat upon the high-heat hot-plate, where the blade of the knife is raised quickly from its cold condition to a maximum heat. This does not burn the filler piece which is carried upon the knife blade because the filler piece is brought to its working condition through the easy heat-application of the knife as the latter is being raised from its cold condition to its hot condition which serves accordingly to temper the high heat in its relation to the filler piece. If the filler piece were placed directly on the hot plate at maximum heat, the filler piece would have its contacting surface charred or burned if said contacting surface were paper or dry granules, or would have its contacting surface fluidified at once if of binder or a meltable crust, before the rest of the piece had received sufficient heat to become workable as a whole, and the plate would be coated and smooched and quickly rendered inoperative.

As soon as the filler piece and knife are heated, the operator takes the first knife and its piece and turns it quickly over bottom-side up with the piece in the shoe-bottom and the knife on top. In the act of turning, he begins the spreading movement so that actually the piece is laid and spread by one movement, although for understanding we analyze it into first turning quickly, then moving laterally to the left and then laterally to the right, and possibly back again. Certainty of action and convenience of flopping i. e. reversing quickly are made possible by the fact that the filler piece, because of the sudden high heat has become tacky or sticky but not fluid, and hence clings or tends to cling to the metal surface, even though hot, sufficiently not to drop off or fly from the knife into space as the blade is quickly turned over, but rather the softened viscous piece clings or adheres enough to the blade to go where desired viz. into the shoe-bottom cavity. The high heat loosens the previously integral or unitary and relatively hard filler piece so that it is capable of being spread instantly by a single sweeping movement or at most by a back and forth movement. The sudden high heat process makes this possible without fatiguing effort. The hand spreading tool or knife or spatula, because of the fact that its blade is thin, holds the heat or maintains the high heat condition only momentarily after leaving the piece. This is of advantage because it releases the piece readily the moment the piece strikes the bottom cavity and it is cooled quickly by the back and forth spreading movement. At the same time that the bottom of the laid piece (which was the top when supported on the blade) is chilled and somewhat stiffened or set by its contact with the damp, cold bottom of the shoe cavity, the thin knife blade is cooled by the rapid heat radiation of its extended area exposed to the surrounding atmosphere. But it retains a concentrated high heat and keeps the piece melted as long as the two are together.

The operator then places a fresh filler piece on the blade and restores it to its original place on the heater, takes up the next or second knife with its properly softened piece and repeats the flopping and spreading operation in a second shoe. He then places a fresh piece on this second knife, puts it back again in place on the heater and takes the third knife with its conditioned piece. He then flops its piece and spreads it in the third shoe-bottom. The operator quickly finds the length of time that is required for properly conditioning a filler piece and if he is very expert he may be able to divide this time so as to accomplish the filling of four, five or it may be, with an unusual operator, six shoes. In this case the hot plate would always hold five knives while he was using the sixth knife. If he is a slow operator, the conditioning period would be divided among a smaller number of knives and pieces. For example, he might be able to fill only three shoes in the piece-conditioning interval. In any event the knife and its load of one filler piece is left on the heater just the length of time required to bring the filler piece into properly conditioned plasticity and this length of time determines the number of knives and their filler pieces employed in accordance with the speed of the operator.

While the foregoing sets forth the preferred carrying out of my invention, it will be understood that the steps may be varied and others substituted within the spirit and scope of my invention. For example, the pieces may be given a preliminary heating in a stack provided they are so stacked or so separated as not to become stuck to each other, or they may be given a pretreatment by wetting in water, hot or cold, or with steam, or other loosening, or they may be given their full conditioning heat without being supported on the knife blade, by regulating the heat more carefully or by being held slightly out of contact with the heater, and the flopping step may be omitted by dropping or sliding the fully conditioned piece directly into the shoe-bottom cavity, and the back and forth sliding spreading movement may be omitted by accomplishing the spreading by a hot roll or bottom leveler with a direct downward pressure. The method first described, however, is preferred as it accomplishes the filling operation wholly by hand and in an exceedingly simple manner within the ability of even the unskilled operator, and with slight expense, great neatness and no waste.

If the filler piece has one side high-heat responsive, as with powdered asphalt, blown asphalt, or other ingredients, as a skin, crust or layer at or near the surface, needing a high heat to render it tacky and flowable, and has the other side or the rest of said piece low-heat responsive, the filler piece is then placed with its high-heat responsive side against the knife blade. The result is that the piece is properly conditioned throughout at about the same time because the side requiring high direct heat is close to the heater and the portion of the filler piece which is more easily responsive is farther away and is exposed to the air circulation. And when turned over onto the bottom of the shoe-bottom cavity the softer and hence more fluid and tacky side of the piece comes against the leather and is instantly stuck fast, while the harder or stiffer opposite side or layer of said piece is spread and its stiffening elements (the partially melted granules of asphalts for example) forced down into and over the entire laid filler, the free melting thereof being completed by the pressure of the hot knife and the smearing spreading movement, where it sets as a superior permanent stiffener coextensive with the bottom cavity. Under such circumstances the heat is preferably extra strong, because the asphalt will stand it, even if the blade reaches momentarily a dull-red heat. This concentrated localized high heat facilitates the instant, smooth spreading of the piece. The passage of the hot spatula in contact with the whole piece, including the original interior of the latter as said interior and the top-layer (original bottom layer next the blade while heating) are flowed together and intermingled in the spreading pressure operation, results in freeing or releasing any and all elements and barriers intended to be released in accordance with whatever construction and combination of filler piece happens to be used. In other words the high-heat interaction is made possible and effective by my method as never before.

My method is especially efficacious in handling the kind of filler piece which is mentioned as preferable in my aforesaid application Ser. No. 297,630 of August 6, 1928. As the sudden loosening of the elements is essential for best results, particularly when the piece is charged with gas producing means and when charged with evaporable means for facilitating spreading and which when spread thin in the shoe-bottom parts with its fluidity and thereby becomes a fixed layer. Such a filler piece if made with a binder containing high melting point asphalt or equivalent high melting point elements is made practical and possible in use by my present high heat method. The high heat produces a sudden loosening and gas releasing without charring or burning or destroying the body material and without premature elimination of any of the elements which are needed for the spreading operation. In the matter of the evaporable means within the filler, the high heat hastens the evaporation. It will be understood that while the handling of the form of piece being now explained is preferably by being heated and handled on the hand tool or spatula, I am now placing emphasis mainly upon the use of high heat whether employed in connection with the hot knife or not.

Another variation of the method of the present application is in connection with the use of a hot roll, at a high heat greater than heretofore possible to be employed. For example in connection with a filler piece such as the one mentioned above in which the upper portion thereof contains hard asphalt and the lower portion is made of softer asphalt or wax tailings or a binder responsive to usual low heat, the piece may be softened or conditioned by a preliminary dipping in water and then placed in the shoe-bottom cavity by hand or otherwise, whereupon it is brought forcibly in contact with the extra hot roll mentioned, which, because of the sudden and concentrated or localized extra high heat application over the top of the laid piece, melts the hard asphalt particles and also penetrates sufficiently to melt the more remote bottom layer of the softer wax tailings or lower melting asphalt so as to stick the piece tenaciously to the bottom. The sudden intense heat converts the moisture of the wet piece into steam which aids materially in the penetration and loosening effect necessary for the melting and the spreading. In case the piece contains included water or absorbed liquid such as oil or other barrier, the evaporable liquid is evaporated quicker with the hot knife, the oil is decimated more efficiently and the barrier is broken down better by the high heat of my present method. As the piece spreads or flows under the quick instant rolling movement, the asphalt, it may be in the form of lumps or particles, some of which may be in the body of the piece, is melted by the direct contact of the super-hot roll. All this is accomplished by a single quick heavy pressure movement forward and back over the piece. This instant movement melts the high-heat-responsive elements, turns the water if present into steam, loosens the piece with the sudden penetration and heat, sticks the previously non-softened piece fast on the innersole, spreads it to the confines of the cavity, evaporates and dissipates the water and any other transitory elements, if any, such as gas for example, and spreads the asphalt or other stiffener in a desired intermixed layer coextensive with the cavity area. Such a result would have been impossible with a low heat, which has always heretofore been considered necessary to employ for the reasons first stated. A further decided advantage of my present method is in its superior loosening effect on the piece. The sudden heat tends to give a sudden excessive loosening resembling an actual puffing of the piece or ebullition, particularly if the piece contains gas producing or steam producing ingredients. This puffing up resembles the effect in baking cake where the high heat produces the desired light structure by generating carbonic gas. So here I rely upon the sudden high heat for puffing up or giving an excessive loosening effect and structure temporarily and instantly utilizing the same to produce the spreading and collapsing thereof with greater ease and rapidity than heretofore possible. An important element in my success is the restriction of this operation to a small amount of the filler and preferably in the form of a piece, and of a piece previously condensed, so that the collapsing spreading movement can take place instantly and coextensively with the piece. If the filler is of the dispersed kind, the super-hot knife or roll dissipates the dispersing film surrounding the globules of wax tailings or the like and brings together or causes said globules to coalesce directly, permanently and tenaciously. The method in this case is practical and effective with such dispersed filler either in bulk or in piece form. The globules of sticky binder are held apart for example by a soap film, permanently enough for purposes of transportation and storage, and this film is instantly broken down and evaporated or otherwise dissipated by the passage of the hot knife or roll over and through the filler as it is being laid, with the effect of suddenly melting the released sticky globules sufficiently to bring them again into their original united condition with relation to each other and to the comminuted body particles of the filler as it is spread by said hot knife or roll in the shoe-bottom cavity, and the dispersing element is more or less eliminated at the same time, which is desirable for the firmer union of the elements and the ultimate firmness of the laid filler. This filler responds to both heat and pressure as set forth in my application Serial No. 336,908, filed February 1, 1929 and Serial No. 399,872, filed August 31, 1929.

As already stated, my present method is not restricted to the application of the filler layer in the shoe-bottom by the use of a commercial piece as an article of manufacture, but is equally applicable to bulk or mass filler. In my copending application Ser. No. 395,664 filed Sept 27, 1929, I have described a filler preferably manufactured, shipped and used as a bulk filler, which contains body material united with soft or low melting sticky binder and which filler contains high heat responsive material, the latter however serving as body material as well as ultimate binder, or in other words constituting binder-body-material. One form of this novel filler consists of comminuted body material such as ground cork mixed, in the sense of being intermingled, with hard hydrocarbons such as rosin, resin gums, asphalts, bituminous materials, and hard wax tailings and the like, or for that matter any combinations of very high melting material with any other binder material with which it will flux and then harden so as to bring the eventual stiffening feature to the desired degree of heat responsiveness, said material being likewise in the form of ground particles or granulations the same as the cork, or other inert or woody matter and these hard hydrocarbons being ground together if desired or otherwise decimated to proper size the same as the cork and both forms of ground matter massed as body material for the time being with the soft wax tailings or other binder into a plastic, coherent filler mass having much the same appearance, consistency and traceability as my old fillers, such for example as shown and described in my Patent 832,002 of September 25, 1906. Other inert materials may be put in along with the high heat subservient granules, and all together constitute body material, reducing the plasticity of the filler, but the broken or fragmentary, pulverized or granulated rosin, using this by way of illustration, is preferable because of its extreme lightness and its capacity for subsequently becoming a stiffener. This element is diffused throughout the mass and takes the place of such proporton of the ground cork and binder as desired, so long as the mass remains coherent. Another form of mass filler responding to my present method of use consists of body material, such for instance as finely ground cork or other preferably woody comminuted matter whose particles are provided with a thin film or coating of the hydrocarbon or other materials just mentioned, sprayed thereon while the particles are agitated, all as set forth in my application last mentioned above. Such body material is united to a coherent condition by means of ordinary or preferred sticky binder of any of the suitable kinds of my previous patents. In any and all of these forms of bulk filler the present method works perfectly but leaves most of the high heat responsive element untouched as body material, simply melting and using as stiffener in the laid filler such portions thereof as come in contact with or under the melting influence of the hot roll, spatula or other super-heated laying tool.

In the drawing in which I have illustrated mechanisms suitable for carrying out my method, Fig. 1 is a side view partly broken away of an electric hot plate, spatula and filler piece, for carrying out my method;

Fig. 2 is a top plan view thereof;

Fig. 3 shows in top plan a shoe-bottom cavity of the forepart of a shoe illustrating my method;

Fig. 4 shows in cross section a shoe being filled according to my method by the aid of a hot roll;

Fig. 5 is a view in end elevation of the hot roll applied to bulk filler in a heap or mass; and Fig. 6 is a similar view showing the use of a spatula or hand tool, the latter being broken away to indicate the high heat character thereof.

I provide a hot plate 1 of any ordinary or preferred construction shown as having heating wires 2 for maintaining the high heat condition in the plate. The operator places a usual filler knife or spatula 3 with its blade 4 flat down upon the top 5 of the plate 1 with a filler piece 6 thereon, said spatula being halted in proper position by a stop 7 and having its handle 8 conveniently resting on a support 9. It will be understood that the plate 1 is preferably rectangular and of a size capable of accommodating the number of knives or spatulas required for keeping the operator busy but without delaying appreciably the filler piece thereon after it is heated and ready for use, six such knives being shown in Fig. 2. Let it be supposed that the piece 6 is of the high-heat blown-asphalt type above mentioned. The operator places a filler piece on each knife and the latter on the plate 1 as shown in Fig. 2 with the knife directly on the plate and the filler piece supported on the knife. In a moment the previously dense and more or less rigid, hard filler begins to loosen by the sudden high heat. As it begins to bubble or expand and rise because of the hot air, gas, steam, or other elements causing the ebullition, the operator quickly lifts the first knife and its piece from its position in Fig. 1 and flops it over into the shoe-bottom cavity 10 as indicated in Figs. 3 and 4, the shoe on its last being held in his left hand in usual manner, bottom-side up. The sudden heat has developed the strong stickiness of the asphalt binder so as to cause the piece to cling to the knife sufficiently not to fall off or be thrown askew or otherwise escape from the control of the operator as he flops it over into the shoe-bottom. At this instant the knife blade is at a high heat. In fact it may be actually red hot if the operator is a very speedy operator and especially if the filler piece has been pretreated by dipping in water. The filler piece is also very hot and very sticky, so that the operator cannot touch either knife blade or filler piece. Hence it becomes very advantageous that the filler piece shall not readily slide on the knife. The tackiness of sticky tenacity therefore of the particular binder mentioned aids in rendering this type of filler piece practical and speedy in connection with the high heat of the knife and the sudden or speedy method explained. The moment the piece touches the bottom of the shoe cavity, the operator instantly brings thereupon the required lengthwise and lateral spreading movement which spreads the highly plastic filler piece in the shoe-bottom into fully expanded position coextensive with the shoe-bottom cavity. Almost immediately the filler sets and the operator repeats the process with the next knife, filler piece, and shoe. He immediately places the shoe on the rack, places another piece on the knife just emptied and places said knife and piece back on the plate, takes another shoe and the next knife and repeats the operation as before but with the second shoe and second knife. Then with the third knife and then the fourth knife and the fifth knife and finally the sixth knife in case the operator is exceedingly speedy and the filler material very hard or heat-refractory. As previously explained if he is a slow operator a smaller number of knives and pieces are used. In any event the number of knives and pieces depends upon the timing necessary for properly softening the successive filler pieces in accordance with the speed of the operator and the surrounding conditions of the factory as to convenience etc., kinds of shoes and such other circumstances as tend to slow down or speed up the operator.

In Figs. 4 and 5 I illustrate a high heat roller or roll 11 electrically heated through wires 12 in position for super-heating and spreading a piece 6 as shown in Fig. 4, or bulk filler 13 as shown in Fig. 5. Fig. 6 shows the bulk filler being spread by a knife or spatula. The innersole is indicated at 14 as supported on a last 15 and connected to the upper 16 at 17 in the usual manner of welt shoes leaving a shoe-bottom cavity 10 in position to receive the piece 6 or the bulk filler 13 for spreading.

As already intimated, my method is novel in employing high heat whether in connection with a knife or roll or otherwise, and is also novel in the various other respects explained, and accordingly it will be understood that I am not limited otherwise than as pointed out in the claims as follows.

I claim:

1. That method of filling shoes with shoe bottom filler containing body material susceptible to burning and binder material of such high melting point as to require for softening it a temperature high enough to burn the body material, which comprises conditioning the filler for spreading by applying to the filler heat sufficiently high to soften the binder and of sufficiently short duration to prevent injury to the body material, and immediately spreading the filler while in softened condition in a shoe bottom cavity.

2. That method of filling shoes, which comprises applying a stronger and higher melting heat to one side of a cold filler piece as a shaped unit having sticking capacity than to the other side of said piece, depositing said piece in the shoe-bottom cavity with the higher heated side uppermost, and sticking the piece to the bottom of the cavity by top pressure to the extent of driving downward into sticking contact with the bottom of said bottom cavity some of the quickened sticky portion of the piece.

3. That method of filling shoes, which comprises providing a shoe-bottom filler which is permanently coherent as an article of manufacture and may be loosened so as to be spreadable by softening treatment and contains low heat responsive material and distinct, segregated stiffening material softened only by high heat, applying sudden high heat momentarily to said filler to soften and diffuse the stiffening material and immediately spreading the filler in the shoe-bottom cavity.

4. That method of filling shoes, which comprises providing a shoe-bottom filler which is permanently coherent as an article of manufacture and may be loosened to a freely spreadable condition by softening treatment and contains low melting point binder and distinct relatively high melting point granules of asphalt for stiffening the filler when laid, depositing said filler in the shoe-bottom cavity, and spreading the same with heat sufficiently high to soften and spread said asphalt granules into a coalescent stiffening layer in the laid filler.

5. That method of filling shoes, which comprises providing a spreadable shoe-bottom filler piece which contains near the surface on one side segregated stiffening material softened only by high heat, depositing said piece in the shoe-bottom cavity, spreading the same, and applying high heat during the spreading sufficient to soften, spread and diffuse said stiffening material so as to become a stiffener for the laid filler coextensive therewith.

6. That method of filling shoes, which comprises providing a spreadable shoe-bottom filler of compacted consistency containing an ingredient capable of loosening the filler to a freely spreadable condition by becoming partially gaseous under heat treatment, subjecting said filler to heat sufficient to loosen the filler structure for easy spreading, and spreading the filler in the shoe-bottom cavity while so loosened.

7. That method of filling shoes, which comprises providing a spreadable shoe-bottom filler of compacted consistency containing evaporable means capable of becoming gaseous and then evaporating under localized heat treatment and spreading said filler in the shoe-bottom cavity through the agency of pressure and localized high-heat.

8. That method of filling shoes, which comprises providing a filler containing low heat responsive material and distinct segregated high heat responsive material, and spreading said filler in the shoe-bottom cavity by the application of high heat over the top surface thereof so as to flux said high heat material and simultaneously drive the low heat material into sticking engagement with the bottom of the cavity.

9. That method of filling shoes, which comprises providing spreadable shoe-bottom filler of compacted consistency containing liquid capable of being converted into steam by heat, placing said filler in the shoe-bottom cavity and applying thereto heat sufficiently high to generate steam and pressure whereby said liquid is converted into steam and caused by said pressure to penetrate, loosen and influence the filler being laid.

10. That method of filling shoes, which comprises providing a spreadable filler containing low heat responsive material and segregated high responsive material requiring sudden high heat treatment for becoming properly spreadable in the shoe-bottom cavity, and applying high heat to said filler in restricted small amounts substantially corresponding to the requirement of a single shoe, to soften the high heat responsive material and diffuse it through the filler.

11. That method of filling shoes, which comprises providing a shoe-bottom filler in the form of a condensed piece adapted to fill a single shoe-bottom cavity and containing means held under special restraint by the condensed condition of the piece responsive to high heat for giving the filler a highly loosened spreadable condition, applying to said condensed piece a sudden high heat treatment adapted to give the piece a sudden excessive loosening, and immediately spreading and collapsing said piece in the shoe-bottom cavity.

12. That method of filling shoes, which comprises providing shoe-bottom filler containing dispersed material responsive to heat and pressure, breaking down said dispersion by heat and pressure and at the same time spreading the filler in the shoe-bottom cavity and causing the dispersed particles to coalesce.

13. That method of filling shoes, which comprises providing shoe-bottom filler containing dispersed material responsive to heat, and breaking down said dispersion by heat treatment, causing the dispersed particles to coalesce and spreading the filler in the shoe-bottom cavity.

14. That method of filling shoes, which comprises providing filler in the form of a piece for a single shoe and suitable for carrying out the following steps, applying sudden high heat to said piece to develop ebullition therein so as to loosen the elements of the piece, then sticking the piece fast on the bottom of the shoe-bottom cavity by the aid of pressure and spreading the piece to the confines of the cavity, simultaneously evaporating and dissipating the transitory elements and spreading the stiffener element of the piece in intermixed relation as a layer coextensive with the cavity area.

15. That method of filling shoes, which comprises placing in a shoe bottom cavity spreadable filler material containing a low heat responsive ingredient and a segregated ingredient which requires high heat for softening and which ultimately becomes stiffer as a result of the application thereto of a sudden high heat, spreading said filler in the shoe-bottom cavity and in connection with said step of spreading the filler applying thereto a localized high heat progressively over the filler being spread in sufficiently direct relation to said stiffening ingredient to momentarily melt and diffuse the same throughout the low heat responsive ingredient of the adjacent top portion of the filler being spread for subsequent hardening as a spread stiffener in the laid filler.

16. That method of filling shoes, which comprises placing in a shoe-bottom cavity spreadable filler material containing a low heat responsive ingredient and a segregated ingredient which becomes stiffer as a result of a heat quickening treatment, at some stage in the process heating said filler material by a localized high heat and then spreading said filler in the shoe-bottom cavity and simultaneously melting said stiffener and diffusing the same over and throughout the adjacent upper portion of the rest of the filler being spread and laid in the cavity.

17. That method of filling shoes, which comprises placing in a shoe-bottom cavity spreadable filler material containing low heat responsive material and segregated particles of a material which requires high heat for softening and which ultimately is caused by said high heat treatment to become a coherent stiffener in and throughout the laid filler layer, and spreading said filler in the shoe-bottom cavity by rolling the same with a roll heated to a high heat capable of melting and diffusing said stiffening ingredient through the low heat responsive material and spreading the same along with the progressive rolling and spreading of the placed filler material as a whole.

18. The herein described method, which comprises providing a cohesive and compacted filler piece of compressed, spreadable filler material adapted when spread in a shoe-bottom cavity to fill the cavity, said piece containing at least adjacent one side thereof low melting filler material and adjacent the other side high-heat responsive filler material which when melted by high heat thereafter forms on setting a stiffener for the entire laid filler, placing said piece in a shoe-bottom cavity with the low melting side down and then passing over the opposite top surface of the piece of spreading tool raised to a high heat, in such direct contact with and progressive movement on the piece as to melt said stiffening material and unite its particles with each other and with the adjacent portions of the piece and spread the same to constitute when set a coherent stiffener for the laid filler uninfluenced in use by normal shoe wearing temperatures.

19. The herein described method of filling shoes, which comprises providing spreadable heat responsive filler material consisting of body material united with low heat responsive sticky binder and containing high heat responsive stiffening material, first giving said filler a preliminary low heat conditioning for spreading, applying the conditioned filler to the shoe-bottom cavity, and then subjecting the filler in the cavity to high heat and pressure and spreading said filler, and simultaneously fluxing the stiffening material into cooperative relation with the laid filler as a permanent stiffener therefor.

20. The herein described method of filling shoes, which comprises providing a shoe-bottom filler containing soft low melting material and hard high heat responsive material, placing said filler in the shoe-bottom cavity, and applying to the top surface thereof a sudden high heat for fluxing the two materials together.

21. That method of filling shoes which comprises providing a segregated quantity of compacted shoe bottom filler adapted to fill a single shoe bottom cavity and containing a high melting point binder, loosening the filler to a freely flowable and spreadable condition through the agency of high heat suddenly and momentarily applied, thereby softening the high melting point binder without charring or burning the fibrous content of the filler, and while so loosened spreading the filler in the shoe bottom cavity.

Signed by me at Cambridge, Massachusetts this twenty-third day of July 1929.

ANDREW THOMA.